US010102025B2

(12) United States Patent
Ansari et al.

(10) Patent No.: US 10,102,025 B2
(45) Date of Patent: Oct. 16, 2018

(54) VIRTUAL MACHINE RESOURCE UTILIZATION IN A DATA CENTER

(71) Applicants: Huawei Technologies Co., Ltd., Shenzhen (CN); New Jersey Institute of Technology, Newark, NJ (US)

(72) Inventors: Nirwan Ansari, Newark, NJ (US); Xiang Sun, Newark, NJ (US)

(73) Assignees: Huawei Technologies Co., Ltd., Shenzhen (CN); New Jersey Institute of Technology, Newark, NJ (US)

( * ) Notice: Subject to any disclaimer, the term of this patent is extended or adjusted under 35 U.S.C. 154(b) by 90 days.

(21) Appl. No.: 15/280,713

(22) Filed: Sep. 29, 2016

(65) Prior Publication Data

US 2017/0344393 A1    Nov. 30, 2017

Related U.S. Application Data

(60) Provisional application No. 62/343,327, filed on May 31, 2016.

(51) Int. Cl.
    *G06F 9/46*      (2006.01)
    *G06F 9/455*     (2018.01)
    *G06F 9/50*      (2006.01)

(52) U.S. Cl.
    CPC ........ *G06F 9/45558* (2013.01); *G06F 9/5077* (2013.01); *G06F 2009/4557* (2013.01)

(58) Field of Classification Search
    None
    See application file for complete search history.

(56) References Cited

U.S. PATENT DOCUMENTS

| 9,772,794  | B2 * | 9/2017  | Li    | G06F 3/065 |
| 2008/0263553 | A1 * | 10/2008 | Lueck | G06F 9/505 |
|            |      |         |       | 718/102 |
| 2010/0180275 | A1 * | 7/2010 | Neogi | G06F 1/3203 |
|            |      |         |       | 718/1 |

(Continued)

OTHER PUBLICATIONS

Birke et al., "Research Report—Data Centers in the Wild: A Large Performance Study," RZ3820, IBM (Apr. 18, 2012).

(Continued)

*Primary Examiner* — Gregory A Kessler
(74) *Attorney, Agent, or Firm* — Leydig, Voit & Mayer, Ltd.

(57) ABSTRACT

An embodiment of the disclosure provides a method, performed by a resource management server, for resource allocation in a virtualization environment. The resource management server includes a non-transient computer readable medium and a processor to execute computer executable instructions stored on the non-transient computer readable medium, so that when the instructions are executed, the resource management server performs the method of: (a) determining an average service rate for each virtual machine (VM) pool running an application; (b) predicting a workload of the application; (c) determining a set of collaborative VMs to serve the application in order to satisfy a service level requirement, the set of collaborative VMs comprising a number of selected VMs from the VM pools running the application; and (d) distributing incoming application requests of the application among the VMs in the set of collaborative VMs.

20 Claims, 9 Drawing Sheets

(56) References Cited

U.S. PATENT DOCUMENTS

| | | | |
|---|---|---|---|
| 2011/0161964 A1* | 6/2011 | Piazza | G06F 9/4881 718/102 |
| 2015/0286507 A1* | 10/2015 | Elmroth | G06F 11/3442 718/104 |

OTHER PUBLICATIONS

Jin et al., "Live Virtual Machine Migration with Adaptive Memory Compression," Institute of Electrical and Electronics Engineers, New York, New York (2009).

Leslie et al., "The Design and Implementation of an Operating System to Support Distributed Multimedia Applications," IEEE Journal on Selected Areas in Communications, vol. 14, Issue 7, pp. 1280-1297, Institute of Electrical and Electronics Engineers, New York, New York (Sep. 1996).

Duda et al., "Borrowed-Virtual-Time (BVT) scheduling: supporting latency-sensitive threads in a general-purpose scheduler," ACM, New York, New York (1999).

"Credit Scheduler," http://wiki.xen.org/wiki/CreditScheduler (Oct. 13, 2016).

Waldspurger, "Memory Resource Management in VMware ESX Sever," Proceedings of the $5^{th}$ Symposium on Operating Systems Design and Implementation, Boston, Massachusetts, USENIX Association (Dec. 9-11, 2002).

Heo et al., "Memory Overbooking and Dynamic Control of Xen Virtual Machines in Consolidated Environments," IM'09 Proceedings of the $11^{th}$ IFIP/IEEE international conference on Symposium on Integrated Network Management, pp. 630-637, IEEE Press, Piscataway, New Jersey (2009).

Lu et al., "Virtual Machine Memory Access Tracing With Hypervisor Exclusive Cache," ATC'07 USENIX Annual Technical Conference on Proceedings of the USENIX Annual Technical Conference, USENIX Association, Berkeley, California (Jun. 17, 2007).

Popa et al., "FairCloud: Sharing the Network in Cloud Computing," SIGCOMM '12, Helsinki, Finland, ACM, New York, New York (Aug. 13-17, 2012).

Sun et al., "Improving Bandwidth Efficiency and Fairness in Cloud Computing," Globecom 2013—Next Generation Networking Symposium, pp. 2313-2318, Institute of Electrical and Electronics Engineers, New York, New York (2013).

Guo et al., "A Cooperative Game Based Allocation for Sharing Data Center Networks," 2013 Proceedings IEEE INFOCOM, pp. 2139-2147, Institute of Electrical and Electronics Engineers, New York, New York (2013).

Liu et al., "A Novel Performance Preserving VM Splitting and Assignment Scheme," IEEE ICC 2014—Selected Areas in Communications Symposium, pp. 4215-4220, Institute of Electrical and Electronics Engineers, New York, New York (2014).

"Amazon EC2 Instance Types," http://aws.amazon.com/ec2/instance-types/ (Published no later than Oct. 31, 2016).

Zhang et al., "On Architecture Design, Congestion Notification, TCP Incase and Power Consumption in Data Centers," IEEE Communications Surveys & Tutorials, vol. 15, Issue 1, First Quarter, pp. 39-64, Institute of Electrical and Electronics Engineers, New York, New York (2013).

Prevost et al., "Load Prediction Algorithm for Multi-Tenant virtual Machine Environments," World Automation Congress, Institute of Electrical and Electronics Engineers, New York, New York (Jun. 24-28, 2012).

Fang et al., "RPPS: A Novel Resource Prediction and Provisioning Scheme in Cloud Data Center," 2012 IEEE Ninth International Conference on Services Computing, pp. 609-616, Institute of Electrical and Electronics Engineers, New York, New York (2012).

Vercauteren et al., "Hierarchical Forecasting of Web Server Workload Using Sequential Monte Carlo Training," IEEE Transaction on Signal Processing, vol. 55, Issue 4, pp. 1286-1297, IEEE Press, Piscataway, New Jersey (Apr. 1, 2007).

Patel et al., "NFRA: Generalized Network Flow-Based Resource Allocation for Hosting Centers," IEEE Transactions on Computers, vol. 62, Issue 9, pp. 1772-1785, IEEE Computer Society, Washington D.C. (Sep. 2013).

Menarini et al., "Green Web Services: Improving Energy Efficiency in Data Centers via Workload Predictions," GREENS 2013, San Francisco, California, pp. 8-15, Institute of Electrical and Electronics Engineers (2013).

Bolch et al., "Queueing Networks and Markov Chains; Modeling and Performance Evaluation with Computer Science Applications; Second Edition," pp. v-878, John Wiley & Sons, Inc., Hoboken, New Jersey (2006).

Desnoyers et al., "Modellus: Automated Modeling of Complex Internet Data Center Applications," ACM Transactions on the Web, vol. 6, Issue 2, Article No. 8, pp. 1-31, ACM, New York, New York (May 1, 2012).

Wood et al., "Black-box and Gray-box Strategies for Virtual Machine Migration," NSDI'07 Proceedings of the $4^{th}$ USENIX conference on Networked systems design & implementation, USENIX Association, Berkeley, California (Apr. 11, 2007).

Sun et al., "Energy-Optimized Bandwidth Allocation Strategy for Mobile Cloud Computing in LTE Networks," 2015 IEEE Wireless Communications and Networking Conference (WCNC):—Track 4—Services, Applications, and Business, pp. 2120-2125, Institute of Electrical and Electronics Engineers (Mar. 9-12, 2015).

"WorldCup98," http://ita.ee.lbl.gov/html/contrib/WorldCup.html (Published no later than Oct. 31, 2016).

Wang et al., "An Energy-awarded Resource Allocation Heuristics for VM Scheduling in Cloud," 2013 IEEE International Conference on High Performance Computing and Communications & 2013 IEEE International Conference on Embedded and Ubiquitous Computing, pp. 587-594, Institute of Electrical and Electronics Engineers, New York, New York (2013).

Farahnakian et al., "Hierarchical Agent-based Architecture for Resource Management in Cloud Data Centers," 2014 IEEE International Conference on Cloud Computing, pp. 928-929, Institute of Electrical and Electronics Engineers, New York, New York (2014).

Xiao et al., "Dynamic Resource Allocation Using Virtual Machines for Cloud Computing Environment," IEEE Transactions on Parallel and Distributed Systems, vol. 24, Issue 6, pp. 1107-1117, Institute of Electrical and Electronics Engineers, New York, New York (Jun. 2013).

Wang et al., "A Resource Management Framework for Multi-tier Service Delivery in Autonomic Virtualized Environments," pp. 310-316, Institute of Electrical and Electronics Engineers, New York, New York (2008).

Wang et al., "AppRAISE: Application-Level Performance Management in Virtualized Server Environments," IEEE Transactions on Network and Service Management, vol. 6, Issue 4, pp. 240-254, Institute of Electrical and Electronics Engineers, New York, New York (Dec. 2009).

Chen et al., "Solving Unbounded Knapsack Problem Based on Quantum Genetic Algorithms," ACIIDS'10 Proceedings of the Second international conference on Intelligent information and database systems: Part 1, pp. 339-349, Springer-Verlag, Berlin, Germany (Mar. 24, 2010).

\* cited by examiner

VIRTUAL MACHINE RESOURCE UTILIZATION IN A DATA CENTER

CROSS-REFERENCE TO RELATED APPLICATIONS

This application claims the benefit of U.S. Provisional Application No. 62/343,327, filed on May 31, 2016, which is hereby incorporated by reference in its entirety.

BACKGROUND

Data centers provide a platform for users to run applications. A data center usually contains a number of computer servers which provide hardware and software resources for storage, management and dissemination of data and information related to the applications.

The servers of the data center may also provide a plurality of virtual machines, one or a subset of which are used to run applications. A virtual machine is an operating system or an application environment that is run within a current operating system on a computer as one of its programs. The selection of virtual machines chosen to run the applications depends on a workload of each of the applications.

The management of both the hardware and software resources of a data center has a significant impact on the cost of operating the data center. The efficient management of the resources of the data center depends on the organization of the resources based on the workloads of the applications.

SUMMARY

An embodiment of the disclosure provides a method, performed by a resource management server, for resource allocation in a virtualization environment. The resource management server includes a non-transient computer readable medium and a processor to execute computer executable instructions stored on the non-transient computer readable medium, so that when the instructions are executed, the resource management server performs the method of: (a) determining an average service rate for each virtual machine (VM) pool running an application; (b) predicting a workload of the application; (c) determining a set of collaborative VMs serve the application in order to satisfy a service level requirement, the set of collaborative VMs comprising a number of selected VMs from the VM pools running the application; and (d) distributing incoming application requests of the application among the VMs in the set of collaborative VMs.

Another embodiment of the disclosure provides a device for resource allocation in a virtualization environment. The device includes a non-transient computer readable medium and a processor to execute computer executable instructions stored on the non-transient computer readable medium, so that when the instructions are executed, the device performs the method of: (a) determining an average service rate for each virtual machine (VM) pool running an application; (b) predicting a workload of the application; (c) determining a set of collaborative VMs serve the application in order to satisfy a service level requirement, the set of collaborative VMs comprising a number of selected VMs from the VM pools running the application; and (d) distributing incoming application requests of the application among the VMs in the set of collaborative VMs.

Yet another embodiment of the disclosure provides a non-transient computer readable medium for resource allocation in a virtualization environment. Computer executable instructions are stored on the non-transient computer readable medium, so that when the instructions are executed, a resource management server performs the method of: (a) determining an average service rate for each virtual machine (VM) pool running an application; (b) predicting a workload of the application; (c) determining a set of collaborative VMs serve the application in order to satisfy a service level requirement, the set of collaborative VMs comprising a number of selected VMs from the VM pools running the application; and (d) distributing incoming application requests of the application among the VMs in the set of collaborative VMs.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Applications in a data center are usually served by collaborative sets of virtual machines (VMs) in order to handle the heavy workload of enterprise applications and guarantee service level requirements, for example, service level agreements (SLA). A collaborative set of VMs is a set of VMs that work together to serve application requests for a specific application. In some instances, selecting smaller sized VMs to serve an application can improve resource utilization. When using more than one VM to serve an application, estimating minimum resource provisioning for the application is difficult. Additionally, in a data center, the size of VMs that can be selected to serve applications are often predefined, that is, VM sizes are not typically determined arbitrarily. For example, one exemplary system may provide 28 kinds of VM instance types, each of which represents a particular size of VM. These VM instances may be separated into 5 groups, each of which fits different types of applications; for instance, computational intensive applications are more suitable to run groups of VMs which are equipped with powerful virtual central processing unit (vCPU). Thus discontinuous sizes of VMs may further complicate resource provisioning for an application.

Embodiments of the disclosure provide a system architecture to implement a dynamic resource provisioning strategy for each application. Embodiments of the disclosure further provide a method that includes decomposing dynamic minimum resource provisioning problem into two sub-problems: (a) Firstly, determining the optimal number of VMs and the optimal size of each VM to serve an application; (b) Secondly, scheduling incoming application requests to different VMs in a set of VMs collaboratively serving the application. By solving these two sub-problems to determine an application's minimum resource provisioning, an improvement to the average resource utilization of servers in a data center can be accomplished.

Figure 1:
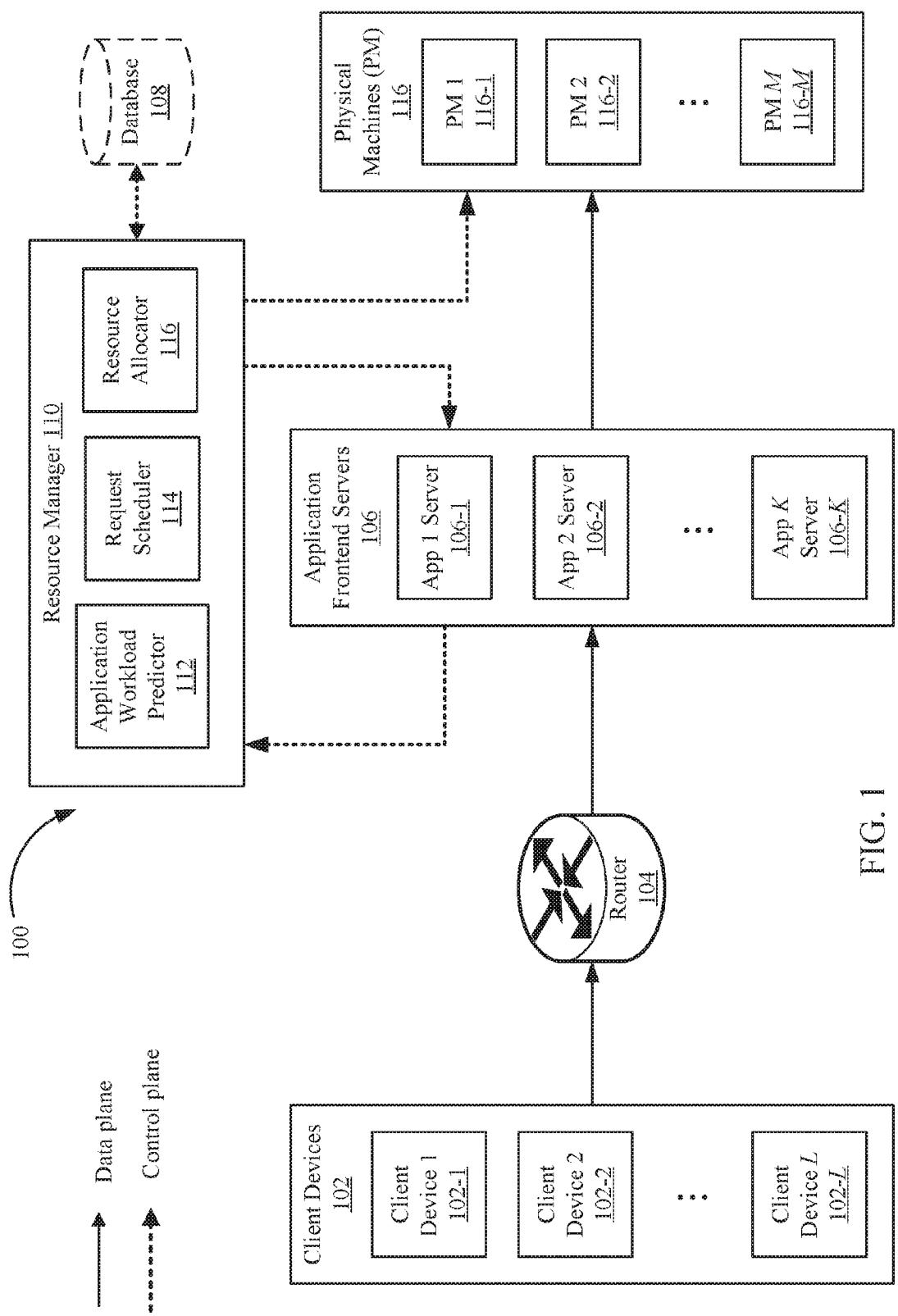
FIG. 1 illustrates an architecture for resource management in a data center according to an embodiment of the disclosure.

FIG. 1 depicts a system architecture 100 for resource management in a data center according to an embodiment of the disclosure. The system architecture 100 includes at least one client device 102, router 104, at least one application frontend server 106, database 108, resource manager 110, and at least one server or physical machine 118. The client devices 102 may include one or more laptop computers, desktop computers, smartphones, personal digital assistant (PDA), etc. The client devices 102 may be operated by multiple users using a variety of applications. For example, client device 1 102-1 may have two users running two applications, and client device 2 102-2 may have one user running three applications. Each client device 102 in FIG. 1 is able to serve a request to run at least one application in the list of applications including App 1, App 2, . . . App K. Although client device 102 is shown as a list of devices ranging from client device 1 102-1 through client device L 102-L, the system architecture 100 may be applied to a situation where only one client device, for example, client device 1 102-1, serves multiple users logged in through a remote connection.

Router 104 receives application requests from client device 1 102-1 through client device L 102-L, aggregates the application requests and routes them to the appropriate application frontend server 106. For example, client device 1 102-1 requests to run App 1 and App 2. Router 104 will process the incoming request and channel the request to run App 1 and App 2 to App 1 Server 106-1 and App 2 Server 106-2, respectively. Router 104 may be a CORE router, for example, the gateware of the network, in the data center.

Application frontend servers 106 are computing devices that receive application requests from router 104. App 1 server 106-1 through App K server 106-K keep track of the number of application arrival requests for its respective application. Thus, App 2 server 106-2 keeps track of the number of application arrival requests for App 2 coming from client device 1 102-1 through client device L 102-L. Application frontend servers 106 provide a time-series of application arrival requests, and this information may be collected for specified timeslots. Application frontend servers 106 is depicted as a collection of App 1 server 106-1 through App K server 106-K, but it is understood that one application frontend server may be set up to track the number of application requests for App 1 through App K.

There are two planes in the architecture of FIG. 1, a control plane and a data plane as indicated by the dotted lines. In the control plane, database 108 serves as storage for the resource manager 110. Database 108 connects to the resource manager 110 to store historical workload of each application. The resource manager 110 analyzes the historical workload for an application and assigns the VMs for the application associated with an application request distribution strategy, for example, round-robin. In the data plane, for each application, the application requests are aggregated to the application frontend servers 106. Then, the application frontend servers 106 distribute those application requests among its virtual machines. The application requests do not go through the resource manager 110. The resource manager 110 assigns the resources to each application and determines the application requests' distribution strategy. For example, assuming the resource manager 110 assigns two VMs to the application, and these two VMs have the same size. Then, the resource manager informs the application frontend servers 106 about the application request strategy, for example, round-robin.

Resource manager 110 is a central controller of the data center. The resource manager 110 has three functions: (a) It retrieves application workload data (including the number of application arrival requests) from each application frontend server through database 108; (b) It determines the minimum resource provisioning for each application in a next forecasting time period; and (c) It allocates the resource for each application in a next forecasting time period, where forecasting time period is a time period where a default number of resources are made available. For example, in a first time period the default number of resources made available are 10 virtual machines, and in a second time period, the default number of resources made available are 14 virtual machines. In some embodiments, resource manager 110 analyzes historical data, for example, data stored in database 108 pertaining to application workload, to forecast workloads for each application in a forecasting time period by applying, for example, an ARIMA (autoregressive integrated moving average) model. In some embodiments, the resource manager 110 determines the minimum resource provisioning for each application in the next forecasting time period by applying a strategy that dynamically adjusts the minimum resource provisioning based on the average arrival rate of application requests. In some embodiments, the length of a timeslot where the resource manager 110 collects workload data from each application frontend server 106 is different from the forecasting time period. For example, each frontend server may upload workload data traces to the database 108 every 10 seconds, and the resource manager 110 would forecast the workload in the next 10 minutes for each application. In the foregoing example, the timeslot is 10 seconds while the forecasting period is 10 minutes.

Resource manager 110 is shown to include application workload predictor 112, request scheduler 114, and resource allocator 116. Application workload predictor 112 and request scheduler 114 perform the two functions identified as (a) and (b) above. The resource allocator 116 maps the minimum resource provisioning determined by the application workload predictor 112 into physical machines (PMs) 118. The minimum resource provisioning determined by the application workload predictor 112 are first provisioned in virtual machines. The virtual machines (VMs) may be selected from a catalogue of virtual machine sizes. For example, resource manager 110 may have access to multiple VMs classified under three types—a central processing unit (CPU) intensive VM, a memory intensive VM, and a network input/output (I/O) intensive VM. Resource manager 110 would then allocate the minimum provisioning to the multiple VMs, for example, choosing to use 5 CPU intensive VMs, 3 memory intensive VMs, and 1 network I/O intensive VM. After the resource allocator 114 selects the VM combination to service application requests made from client devices 102, the resource allocator 114 then maps these selected VMs to PMs 118.

Physical machines 118 include one or more PMs labeled PM 1 118-1 through PM M 118-M to serve App 1 through App K depending on application requests received at router 104. Each PM in PM 118 includes a hypervisor to create and run virtual machines (VM) according to some embodiments of the disclosure.

Figure 2:
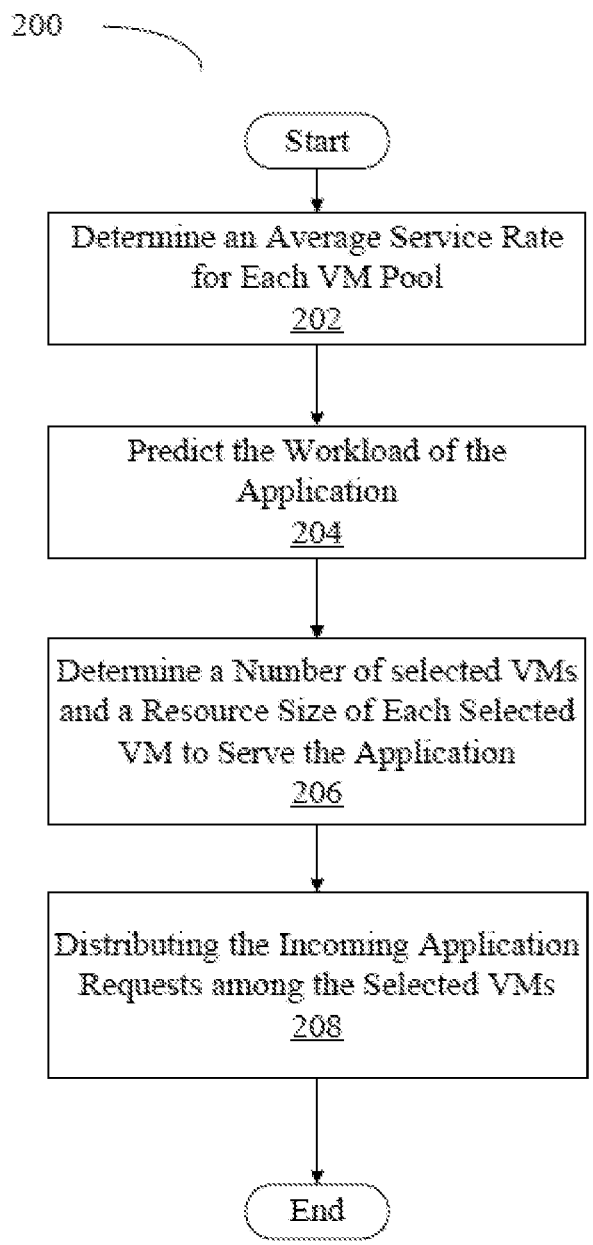
FIG. 2 illustrates a flowchart of a resource allocation process according to an embodiment of the disclosure.

Embodiments of the disclosure provide a system and method for VM allocation. FIG. 2 illustrates a flow diagram showing a process 200 for allocating VM resources to an application according to an embodiment of the disclosure. In order to use services provided by data center 100, client devices 102 in FIG. 1 upload application requests of one or more applications to router 104 in the data center 100. The frontend servers 106 keep track of the number of the application requests of each application, and in some embodiments, store the number of these requests for each application in the database 108. Without loss of generality, one application will be used to explain embodiments of the disclosure. It is understood that another application may undergo similar procedures either sequentially or in parallel to the application chosen to illustrate the VM resource allocation process 200 of FIG. 2.

At Step 202, resource manager device 110 in the data center 100 tests an average service rate of each VM from different VM pools running the application. VM pools are defined as a grouping of VMs of similar sizes. For example, as earlier stated, an exemplary data center may provide 28 kinds of VM instance types. These VM instance types are referred to as VM pools. For example, VM pool 1 constitutes a total of 6 VMs sized with {CPU, memory} of {0.8, 1.4} units, and VM pool 2 constitutes a total of 4 VMs sized with {1, 1.2} units. Due to the differences in resources between VM pool 1 and VM pool 2, when an application request is serviced by a VM in each VM pool, there may exist discrepancy in the completion times of servicing the application request. Thus, at step 202, resource manager device 110 quantifies, for each VM pool, average service rates of application requests to the VM pool for the chosen application. This step is depicted graphically in FIG. 7A where a request for App1 is tested in VM1 and VM2, with VM1 belonging to VM pool 1 and VM2 belonging to VM pool 2.

At Step 204, application workload predictor 112 in the resource manager device 110 predicts the workload of the application. The application workload predictor 112 utilizes an historical number of application requests from previous timeslots to predict a number of application requests expected from the client devices 102 in a next timeslot. An application's workload, therefore, may be quantified as the number of application requests received at a certain time period. The application workload predictor 112 sends the predicted workload data to the request scheduler 114 in the resource manager device 110.

At Step 206, request scheduler 114 in the resource manager device 110 determines a number of VMs from one or more VM pools to service application requests in the next time period. For simplicity in explanation, the next time period and the next timeslot will be used interchangeably to distinguish from historical timeslots. In some embodiments, an application may be matched to a subset of VM pools with certain qualities and only this subset of VM pools are available for selection to service the application. For example, the VM pools can be separated into four group types: CPU intensive group type, memory intensive group type, network intensive group type, and GPU intensive group type. The request scheduler 114 then selects VMs for running a CPU intensive application from the VM pools in the CPU intensive group type. Thus, the VMs selected to run an application may be allocated from VM pools in the group which is of the same type as the application. The request scheduler 114 in the resource manager device 110 determines the number of VMs based on the predicted workload of the application, received from the application workload predictor 112, and the average service rate of each VM pool, obtained through Step 202. VM pools are used as a way to group similarly sized VMs together. In some instances, each VM may be treated separately, therefore, an average service rate of each VM would be obtained at Step 202 and used by the request scheduler 114 at Step 206. Step 206 is depicted graphically in FIG. 7B where three VMs, VM A, VM B, and VM C, from two VM pools, VM pool 1 and VM pool 2, are activated to serve App 1.

Figure 8:
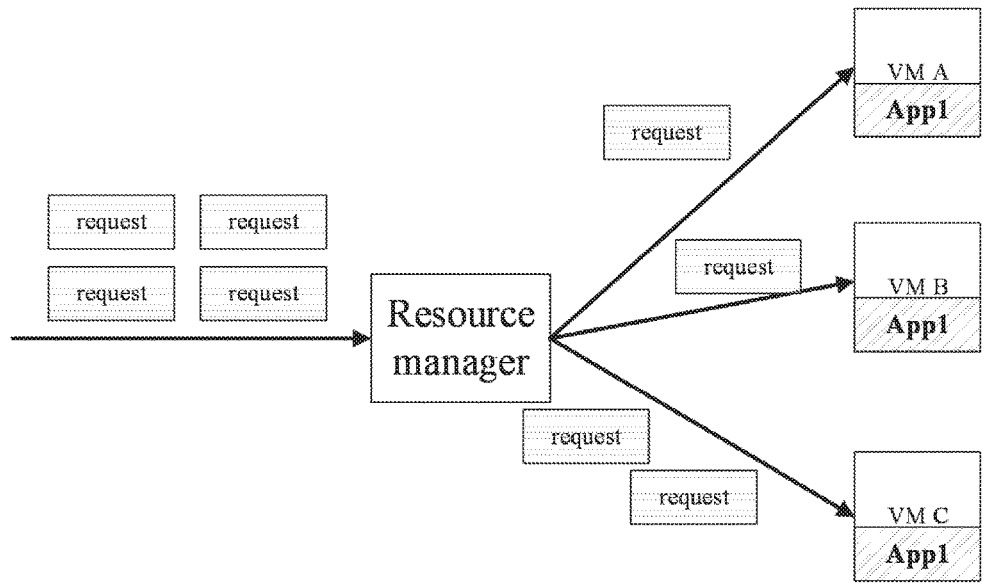
FIG. 8 illustrates a graphical depiction of allocating incoming requests to virtual machines according to an embodiment of the disclosure.

At Step 208, the resource allocator 116 of the resource manager device 110 distributes incoming application requests forwarded from the frontend servers 106 among the VMs selected by the request scheduler 114 at step 206. The resource allocator 116 apportions the selected VMs to the incoming application requests based on the number of the selected VMs and the average service rate of the VMs obtained through Step 202. Step 208 is depicted graphically in FIG. 8 where incoming requests of App1 are distributed by the resource manager device 110 to selected VMs—VM A, VM B, and VM C.

Figure 3:
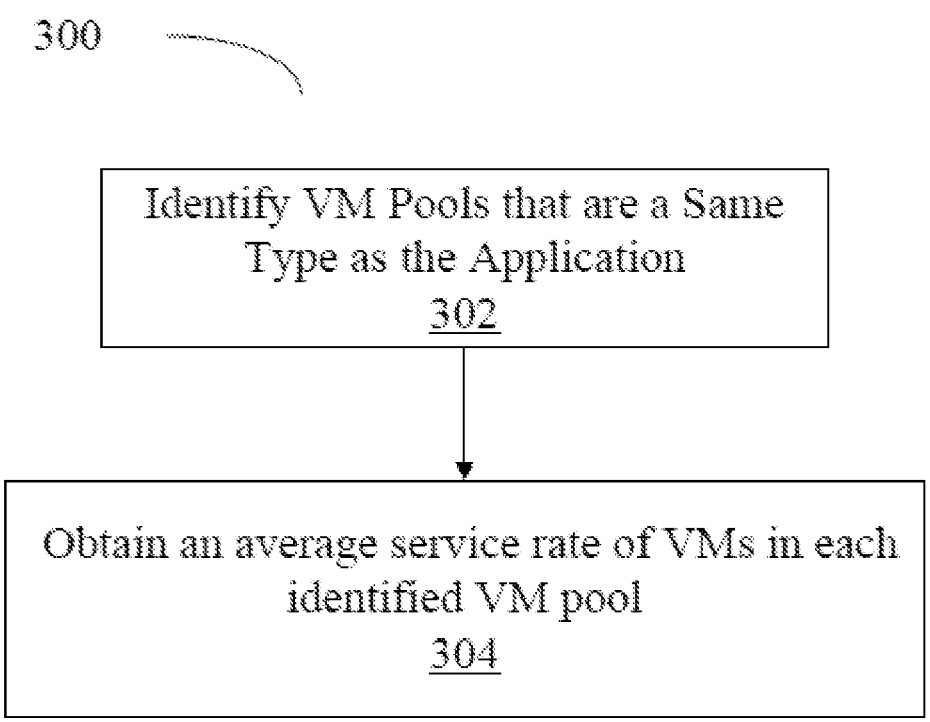
FIG. 3 illustrates a flowchart of a process of test running an application according to an embodiment of the disclosure.

FIG. 3 illustrates a flow diagram showing a process 300 of testing and obtaining an average service rate for each VM pool according to an embodiment of the disclosure. Process 300 is a detailed view of steps involved in Step 202 of FIG. 2 according to some embodiments. At Step 302, the request scheduler 114 identifies VM pools that are a same type as the application. For instance, when the application is CPU intensive, the resource manager device will select the VMs from CPU intensive group to serve the application.

Figure 7A:
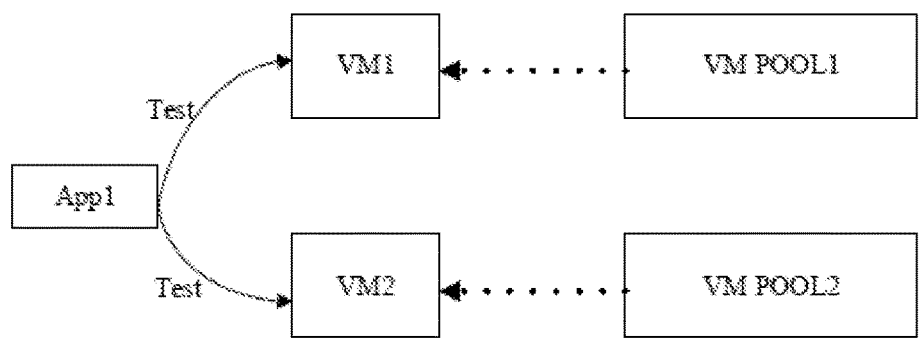
FIGS. 7A-7B illustrate graphical depictions of virtual machine testing and selection according to an embodiment of the disclosure.
Figure 7B:
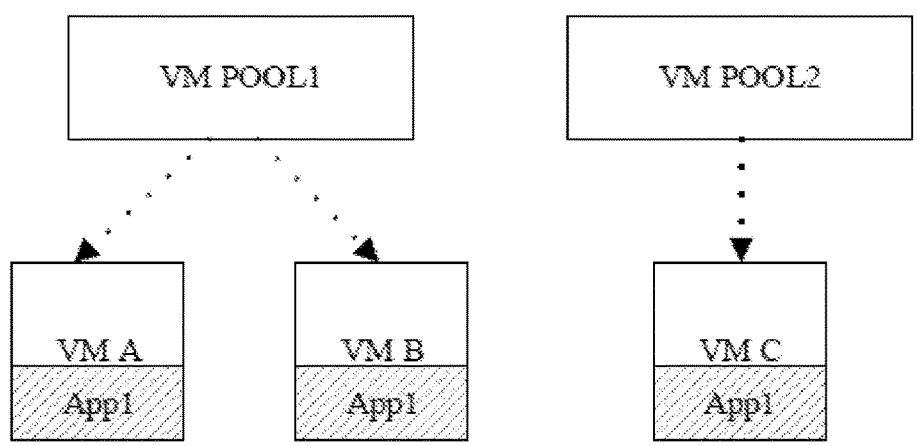

At Step 304, the request scheduler 114 obtains an average service rate of VMs in each identified VM pool. For example, as shown in FIG. 7A, an application request for App1 (a CPU intensive application) is sent to the router 104 to be run in the data center. Assume two CPU intensive VM pools are available—VM pool 1 and VM pool 2. The request scheduler 114 pre-tests running service requests of App1 in the two VMs, one VM from VM pool 1 and another VM from VM pool 2. After the pre-test, average service rates of a VM from each of the two VM pools are obtained, that is, an average service rate of a VM from VM pool 1 serving App1 is obtained, and an average service rate of a VM from VM pool 2 serving App1 is obtained. The average service rate informs of a number of requests that a VM can serve during a fixed time period.

In some embodiments, instead of using representative VMs in VM pool 1 and VM pool 2 to get the average service rates, the pre-test may comprise running service requests of App1 on each VM in each pool and obtaining an average of the service rates of each VM pool. For example, consider that VM11, VM12, VM13, VM14 are in VM pool 1, and VM21, VM22, and VM23 are in VM pool 2. In this example, VMxy refers to the y-th VM in VM pool x. Service rates can be obtained for each VM in VM pool 1 and each VM in VM pool 2. Then the service rates of VM11, VM12, VM13, and VM14 can be averaged to obtain the average service rate of a VM in VM pool 1, and the service rates of VM21, VM22, and VM23 can be averaged to obtain the average service rate of a VM in VM pool 2.

Step 304 may be described mathematically. Let A denote the set of applications running in the data center, $N_i$ denote the set of collaborative VMs that are serving application $i(i \in A)$, and $J_i$ denote the set of VM pools which are of the same type as the application i.

The resource manager device 110 sequentially pre-tests the application i running in a VM from different VM pools in $J_i$ and obtains the average service rates of the VMs corresponding to different VM pools in $J_i$, where one VM serving a particular application may follow an M/M/1 queuing model. In some embodiments, other distributions of arrival and service rate of a VM may be used, for example, M/G/1 queuing, G/G/1 queuing, etc.

Let $y_{i,k}$ ($k \in N_i$) denote the average service rate of VM k serving application i in each time slot, and $X_i = \{x_{i,k} | k \in N_i\}$ denote the request scheduling strategy applied to collaborative VM set $N_i$ in the next time slot. The request scheduling strategy may be thought of as the fraction of requests of application i in assigned to VM k. The value of $y_{i,k}$ depends on the size (number of resource units) of VM k. In some embodiments, VMs in the data center can be chosen from predefined VM pools. Thus, $U_i = \{u_{i,j} | j \in J_i\}$ may be defined as the feasible set of $y_{i,k}$ (i.e., $y_{i,k} \in U_i$) where $u_{i,j}$ denotes the average service rate of a VM from VM pool j serving application i.

Figure 4:
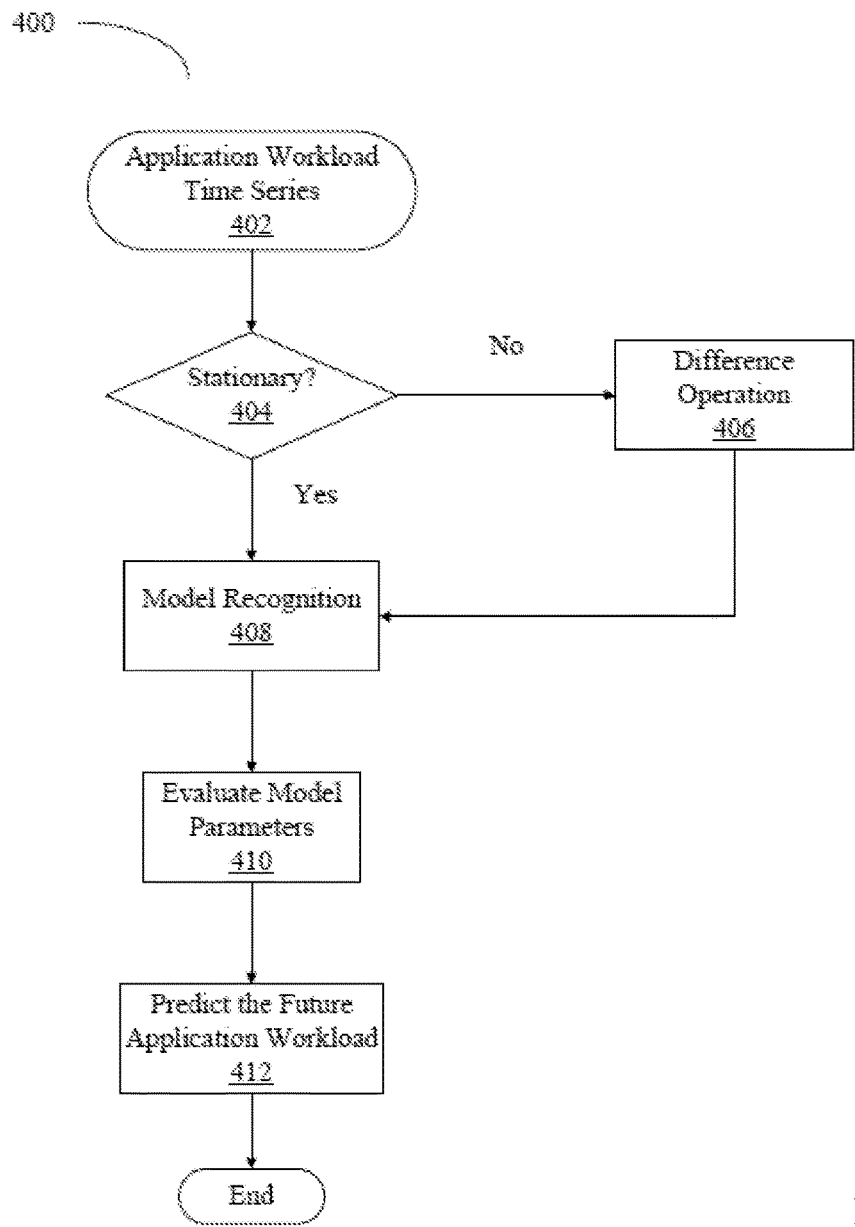
FIG. 4 illustrates a flowchart of predicting a workload according to an embodiment of the disclosure.

FIG. 4 illustrates a flow diagram showing a process 400 of predicting workload of an application according to an embodiment of the disclosure. Process 400 is a detailed view of steps involved at Step 204 of FIG. 2 according to some embodiments. At Step 402, application frontend servers 106 monitor application workload time series in previous timeslots, storing this data in the database 108.

At Step 404, the application workload predictor 112 observes and determines whether the workload time series in previous timeslots are stationary. Statistically, a stationary time series is defined as a time series that has constant statistical properties over time. For example, mean, variance, autocorrelation, etc., are constant over time. Mathematically, the observed application workload value time series may be denoted as $S = \{s(0), s(1) \ldots s(T-1)\}$ where T is the length of historical data that is used to predict the future application workload, and s(0) is the workload at a time 0.

In some embodiments, when some application workload time series are stationary over time, the workload is determined as the same as the previous application workload value time series.

In other embodiments, some application workload time series may exhibit non-stationary features, for example, sudden huge spikes occasionally occurring over time. Non-stationary time series include workload time series that exhibit diurnal or a weekly cycle. At Step 406, if the time series S is not a stationary time series, that is, the data in S exhibits noticeable deviations from stationary and the autocorrelation function of S slowly decays, then a transformation is performed on the time series S in order to smooth the time series. In some embodiments, the transformation is a difference operation applied to S to obtain $S' = \{s'(t) | s'(t) = s(t) - s(t-1), 0 < t \leq T-1\}$.

At Step 408, an AutoRegressive Integrated Moving Average (ARIMA) model is applied to the time series S when S is stationary or the transformed time series S' when S is non-stationary to predict application workload. ARIMA is used since ARIMA can automatically analyze the feature of each application workload first, and then select different kinds of mathematical models, for example, AutoRegressive (AR) model, Moving Average (MA) model and AutoRegressive Moving Average (ARMA) model, to forecast the application workload in the next timeslot.

Further, AR(p), MA(q) and ARMA(p,q) model are applied to predict the future application workload based on its historical data S or S'. For simplicity in explanation, S' will be referred to in the rest of the process 400. The values of p and q indicate the order of the autoregressive portion and the order of the moving average portion. Since AR(p) and MA(q) are the special case of ARMA(p,q) model, that is, if p=0, then ARMA(0,q)=MA(q) and if q=0, then ARMA(p,0)=AR(p). Thus, a general ARIMA (p,q) model may be used to formulate an expression of s'(T):

$$s'(T) = c + \phi_1 s'(T-1) + \ldots + \phi_p s'(T-1) + \varepsilon(T) + \theta_1 \varepsilon(T-1) + \ldots + \theta_q \varepsilon(T-q) \quad \text{(Eqn. 1)}$$

where c, $\{\phi_1, \phi_2 \ldots \phi_p\}$ and $\{\theta_1, \theta_2 \ldots \theta_q\}$ are all the constants to be determined, $\{s'(T-1), \ldots s'(T-p)\}$ are the lagged values of s'(T), $\varepsilon(T)$ is a white noise process with mean zero and variance $\sigma^2$, $\{\varepsilon(T-1), \ldots \varepsilon(T-q)\}$ are the lagged values of $\varepsilon(T)$.

At Step 410, the model parameters from the model applied at step 408 are evaluated. In order to predict the value of s'(T) based on Eqn. 1, the parameters p, q, c, $\sigma^2$, $\{\phi_1, \phi_2 \ldots \phi_p\}$, and $\{\theta_1, \theta_2 \ldots \theta_p\}$ are calculated based on historical data trace S'. The application workload predictor 112 may apply Akaike's Information Criterion (AIC) to determine the optimal value of p and q. Also, innovation algorithm is selected to determine the value of c, $\sigma^2$, $\{\hat{\phi}_1, \hat{\phi}_2 \ldots \hat{\phi}_p\}$ and $\{\theta_1, \theta_2 \ldots \theta_p\}$. Innovation algorithm is a recursive one-step ahead prediction algorithm found in Brockwell, P., Davis, R., 1991. *Time Series: Theory and Methods*, 2nd Edition. Springer, New York.

At Step 412, the future application workload is predicted. In some embodiments, the application workload predictor 112 adopts the autocorrelation function (ACF) and partial autocorrelation function (PACF) to represent characteristics of the smoothed time series S'. After applying ACF to the smoothed time series S', a resulting time series of ACF may show either a truncation or a tailing characteristic. Similarly, after applying PACF to the smoothed time series S', a resulting time series of PACF may show either a truncation or a tailing characteristic. The combination of the characteristics seen from the resulting time series of ACF and PACF are then used to determine which model to select in predicting the application workload. For example, if a result of ACF applied to S' shows a tailing characteristic and a result of PACF applied to S' shows a truncation characteristic, then the AutoRegressive (AR) model is selected to predict the application workload. If a result of ACT shows truncation and a result of PACF shows tailing, then the Moving Average (MA) model is selected to predict the application workload. Lastly, if a result of ACT shows tailing and a result of PACF also shows tailing, then the AutoRegressive Moving Average (ARMA) model is selected to predict the application workload.

Figure 5:
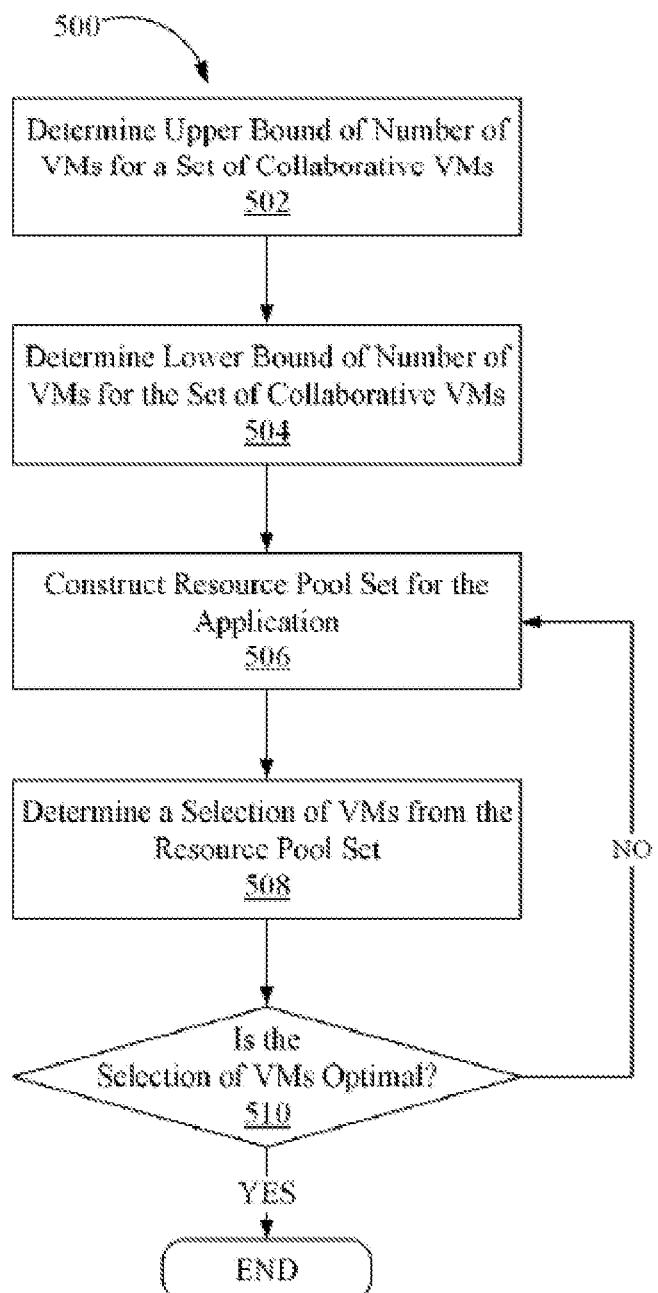
FIG. 5 illustrates a flowchart of virtual machine selection according to an embodiment of the disclosure.

FIG. 5 illustrates a flow diagram showing a VM selection process 500 for determining a number of VMs and a resource size of each VM to serve an application. The VM selection process 500 is a detailed embodiment of steps involved in step 206. In order to determine the number of VMs to select and what the resource size each VM should be, application requirements are used to set boundaries. The boundaries may be summarized as:

(1) Service Level Agreement (SLA) of the application should be met. The SLA is defined as the time constraint of the application's average response time.
(2) Select enough VMs to serve requests of the application, and each VM chosen to serve a request should satisfy the application's SLA.
(3) For stability, the average service rate of each VM should be larger than its average arrival rate.

The boundaries identified provide that at step 202 of FIG. 2, the service rate of each VM pool is determined. Thus a characterization of an appropriate set of VM pools is performed. At step 204 of FIG. 2, an expected workload is determined. At step 206, from the appropriate set of VM pools, VMs should be selected to serve the expected workload meeting constraints (1)-(3).

In some embodiments, when modeling request arrival rates of an application and the service rate of a VM as Poisson distributions, mathematically, VM selection process 500 involves solving Eqn. 2.

$$\underset{x_{i,k}, y_{i,k}, |N_i|}{\operatorname{argmax}} \frac{1}{|N_i|} \sum_{k \in N_i} \frac{\lambda_i x_{i,k}}{y_{i,k}} \text{ s.t. } 0 < \frac{1}{y_{i,k} - \lambda_i x_{i,k}} \leq \tau_i, \quad \text{(Eqn. 2)}$$

$$\forall k \in N_i \sum_{k \in N_i} x_{i,k} = 1 \; y_{i,k} \in U_i, x_{i,k} \geq 0, \forall k \in N_i$$

In Eqn. 2, $N_i$ is a set of collaborative VMs serving application i, $\tau_i$ is the SLA for application i, an average arrival rate of a request of application i based on the Poisson distribution in a next time slot is denoted as $\lambda_i$, the fraction of application i's requests assigned to VM k is denoted as $x_{i,k}$, VM k's average arrival rate is $\lambda_i x_{i,k}$, service rate of VM k serving a request of application i in each timeslot is $y_{i,k}$, and average response time of VM k is defined as $(y_{i,k} - \lambda_i x_{i,k})^{-1}$. Eqn. 2 shows that an objective is to maximize the average resource utilization of the set of collaborative VMs such that: (1) the average response time of VM k is less than the SLA, (2) one application i request is serviced by one VM, and (3) VMs are chosen from VM pools with average service rates in $U_i$.

In order to obtain $N_i$, the set of collaborative VMs serving application i, the process 500 is performed by the request scheduler 114. At step 502, an upper bound for the number of VMs in the set of collaborative VMs is determined. This upper bound may be determined based on average response times of different VM pools in the data center. The upper bound is the smallest number of VMs from the slowest VM pools that meet the SLA.

At step 504, a lower bound for the number of VMs in the set of collaborative VMs is determined. This lower bound may also be determined based on average response times of different VM pools in the data center. The lower bound is the smallest number of VMs from the fastest VM pools that meet the SLA. Once the upper bound and the lower bound for the number of VMs in the collaborative set are determined, steps 506, 508, and 510 involve iterating over the range between the lower bound and the upper bound to find an optimal number of VMs within these bounds as the number of VMs in the set of collaborative VMs.

At step 506, the request scheduler 114 constructs a resource pool set for the application. In some embodiments, this may involve choosing an equal number of VMs from each VM pool matching the application type. In some instances, the number VMs chosen from each VM pool is between the lower bound and the upper bound determined at steps 504 and 502, respectively. For example if three VM pools match the application type, and the lower bound is determined to be 3 and the upper bound is determined to be 8, then step 506 may involve selecting 5 VMs from each VM pool to have a total of 15 VMs in the resource pool set.

At step 508, the request scheduler 114 determines a selection of VMs from the resource pool set constructed in step 506. The request scheduler 114 determines the selection of VMs by picking a number of VMs from the resource pool set such that the average time spent by the selection of VMs is maximum without violating SLA of the application. In some embodiments, the SLA is determined to not be violated when the average service rate of the selection of VMs meets or exceeds the sum of the average arrival rate of application requests for one VM in the selection of VMs and an SLA service rate. The SLA service rate here is defined as the reciprocal of the SLA. In some embodiments, in addition to the constraint of not violating the SLA, the number of VMs picked from the resource pool set as the selection of VMs is equal to the total number of one VM pool in the resource pool set.

In some embodiments, at step 508, a branch and bound algorithm may be used to determine the selection of VMs that maximizes the average time spent by the selection of VMs given the resource pool set determined at step 506. In some instances, when the number of VMs in each VM pool in the resource pool set is equal, the branch and bound algorithm takes this into account.

At step 510, the request scheduler 114 determines whether the selection of VMs is an optimal selection of VMs. If the selection is optimal, then the process ends and the selection of VMs is determined to be the set of collaborative VMs to serve the application. If the selection of VMs is not optimal, then step 506 is repeated to construct a resource pool set for the application with a different number of VMs chosen from each VM pool.

In some embodiments, steps 506, 508, and 510 involve a search process where the number of VMs in each VM pool set when constructing resource pool sets for the application is varied from the lower bound to the upper bound by increments of 1. And when the branch and bound method is used to determine each selection of VMs at step 508, there will be a selection of VMs that has a maximum average time spent to serve application requests without violating the SLA. This selection of VMs with the maximum average time spent to serve application requests is then determined to be optimal and thus becomes the set of collaborative VMs to serve the application.

Process 500 may be described mathematically. Steps 502 and 504 where the upper bound and lower bound for the number of VMs in the set of collaborative VMs is determined may be expressed as Eqns. 3 and 4.

$$|N_i|^{lower} = \lceil \lambda_i / (u_{i,j}^{max} - 1/\tau_i) \rceil \quad \text{(Eqn. 3)}$$

$$|N_i|^{upper} = \lceil \lambda_i / (u_{i,j}^{max} - 1/\tau_i) \rceil \quad \text{(Eqn. 3)}$$

In Eqn. 3, $|N_i|$ gets its lower bound when VMs with the highest service rate are chosen to serve application i, that is, $y_{i,k} = u_{i,j}^{max}$ where $k \in N_i$ and $u_{i,j}^{max} = \max\{u_{i,j} | u_{i,j} > 1/\tau_i, 1 \leq j \leq |J_i|\}$. Similarly, in Eqn. 4, $|N_i|$ gets its upper bound when VMs with the lowest service rate are chosen to serve application i, that is, $y_{i,k} = u_{i,j}^{min}$ where $k \in N_i$ and $u_{i,j}^{min} = \max\{u_{i,j} | u_{i,j} > 1/\tau_i, 1 \leq j \leq |J_i|\}$.

At step 506, a new resource pool set $V_i$ for application i may be constructed by taking $|N_i|$ number of VMs from each VM pool $j \in J_i$. Thus, $V_i$ may be defined as Eqn. 5.

$$V_i = \{v_{i,j,m} | 1 \leq j \leq |J_i|, 1 \leq m \leq |N_i|, v_{i,j,1} = v_{i,j,2} = \ldots = v_{i,j,|N_i|} = u_{i,j}\} \quad \text{(Eqn. 5)}$$

Where in Eqn. 5, $v_{i,j,m}$ is the average service rate of the mth VM from VM pool j serving application i.

At step 508, the goal is to determine which VMs out of the resource pool set $V_i$ should be selected to serve the application. An indicator matrix $H_i$ defined by Eqn. 6 may be used to indicate whether the mth VM from VM pool j is selected to serve application i (that is, $\eta_{i,j,m}=1$) or not.

$$H_i=\{\eta_{i,j,m}|\eta_{i,j,m}\in\{0,1\}, 1\le j\le |J_i|, 1\le m\le |N_i|\} \quad \text{(Eqn. 6)}$$

Using the branch and bound method, Eqn. 7 is solved to find the values for the indicator matrix $H_i$ that maximize the average time spent by the VMs selected to serve application i.

$$\operatorname*{argmax}_{\eta_{i,j,m}} \frac{1}{|N_i|} \sum_{j=1}^{|J_i|} \sum_{m=1}^{|N_i|} \frac{\eta_{i,j,m}}{v_{i,j,m}} \text{ s.t. } \sum_{j=1}^{|J_i|} \sum_{m=1}^{|N_i|} v_{i,j,m} \eta_{i,j,m} \ge \quad \text{(Eqn. 7)}$$

$$\lambda_i + \frac{|N_i|}{\tau_i} \sum_{j=1}^{|J_i|} \sum_{m=1}^{|N_i|} \eta_{i,j,m} = |N_i|$$

The first constraint in Eqn. 7 guarantees that the SLA is met, and the second constraint in Eqn. 7 guarantees that a total number of $|N_i|$ VMs are selected out of a total number of $|J_i|\times|N_i|$ VMs in the resource pool set to serve application i.

As previously stated, the different values for $|N_i|$ ranging from $|N_i|^{lower}$ to $|N_i|^{upper}$ may be used to construct different resource pool sets for each $|N_i|$ value. Step 508 then produces multiple indicator matrices $H_i$ for each value of $|N_i|$.

At step 510, the resource scheduler 114 determines whether the $|N_i|$ VMs selected form an optimal selection. This step involves choosing the value of $|N_i|$ and the indicator matrix $H_i$ that maximizes Eqn. 7 as the optimal selection. The optimal selection will be denoted mathematically with an asterisk symbol in the equations. The explanation here shows generating the different resource pool sets in parallel and selecting the one that maximizes Eqn. 7. In some embodiments as shown in FIG. 5, steps 506, 508, and 510 may be performed iteratively.

Figure 6:
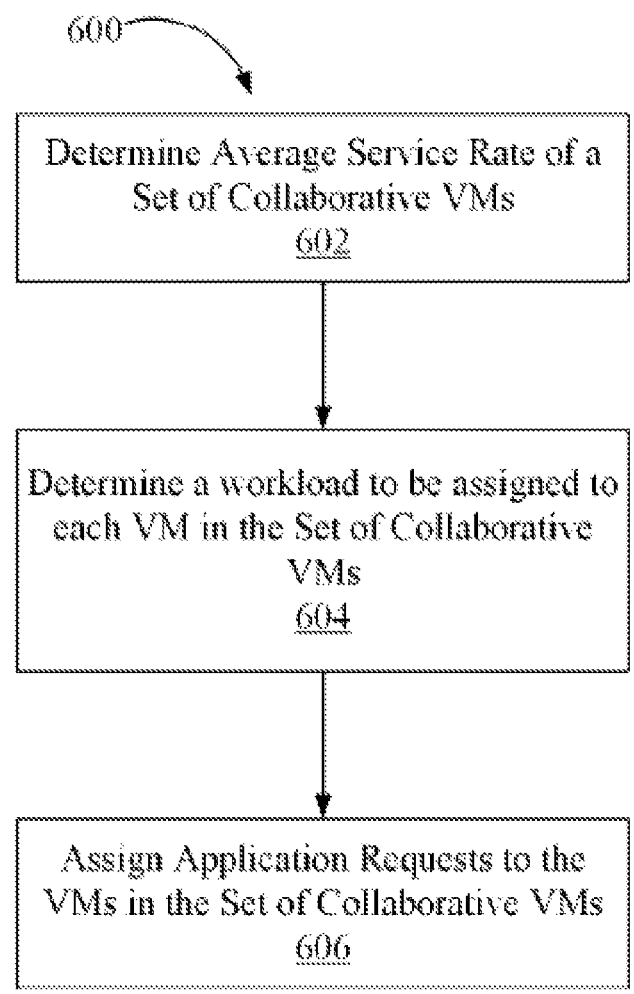
FIG. 6 illustrates a flowchart of allocating incoming requests to selected virtual machines according to an embodiment of the disclosure.

FIG. 6 illustrates a flow diagram showing a process 600, performed by the resource allocator 116, of distributing incoming application requests among a set of collaborative VMs serving an application according to an embodiment of the disclosure. Process 600 is a detailed view of the steps involved in step 208 of FIG. 2 according to some embodiments. At step 602, average service rates of each VM in the set of collaborative VMs is determined. This may be determined by acknowledging the VM pool that each VM in the set of collaborative VMs belongs and using the corresponding service rates determined at step 202 as average service rates for their respective VMs.

At step 604, the resource allocator 116 determines a workload to be assigned to each VM in the set of collaborative VMs. Using the average service rates of the VMs determined at step 602 and the number of VMs in the set of collaborative VMs, a linear programming optimization may be performed to maximize average resource utilization in the set of collaborative VMs. The workloads assigned to the VMs that maximize the average resource utilization may be expressed in terms of a fraction of requests for the application assigned to each VM.

At step 606, the resource allocator 116 assigns requests to VMs in the set of collaborative VMs in a manner that meets the workload determined at step 604.

Process 600 may be described mathematically. At step 602, average service rates of the selected VMs may be obtained by multiplying the optimal indicator matrix and the optimal average service rates of the resource pool set as provided in Eqn. 8.

$$Y_i^* = H_i^* \times V_i^* \quad \text{(Eqn. 8)}$$

At step 604, Eqn. 9 may be optimized to determine a fraction of requests for application i assigned to VM k in the optimal selection (that is, the set of collaborative VMs).

$$\operatorname*{argmax}_{x_{i,k}} \frac{1}{|N_i|^*} \sum_{k\in N_i^*} \frac{\lambda_i}{y_{i,k}^*} x_{i,k} \text{ s.t. } 0 < x_{i,k} \le \frac{y_{i,k}^*}{\lambda_i} - \frac{1}{\tau_i \lambda_i} \sum_{k\in N_i^*} x_{i,k} = 1 \quad \text{(Eqn. 9)}$$

Eqn. 9 is a maximization of average resource utilization in the set of collaborative VMs. Eqn. 9 is a linear programming problem and may be solved using the Simplex Method. The first constraint in Eqn. 9 guarantees that the average response time of VM k is less than the SLA for application i given the a value of $y_{i,k}^*$, and the second constraint guarantees that one request is served by one VM. Once the workload of each VM in the set of collaborative VMs is determined, at step 608, application requests are assigned to each VM to meet the prescribed distribution of workload determined by maximizing Eqn. 9.

Figure 9:
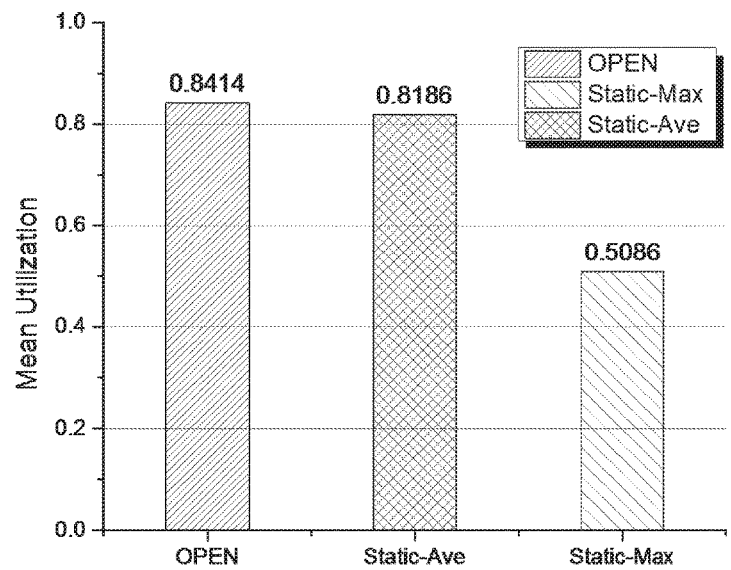
FIG. 9 illustrates a result of resource management according to an embodiment of the disclosure.

FIG. 9 illustrates simulation results of some of the above embodiments. To develop these results six types of VM pools (that is, $|J_i|=6$) in the data center 100 are built for a particular application type (e.g., CPU intensive application). The corresponding application A is required to be assigned the minimum resources, so that its SLA or $\tau_A$, can be satisfied in each time slot. Assuming the SLA of application A is 400 ms, that is, $\tau_A=400$ ms, and using some embodiments of the disclosure, application A's resource provisioning is adjusted for each 10 min interval, that is, the duration of one time slot is 10 min for resource management.

FIG. 9 shows that some embodiments of the disclosure allow resource provisioning that can be dynamically adjusted according to the arrival rate of application A's requests. Accordingly, the resource utilization is maintained at a higher level, between 80%-88%, compared to other strategies. Compared to the Static-Max strategy and the Static-Ave strategy, embodiments of the disclosure achieve the highest mean of the average resource utilization for serving application A during a one day period. Static-Max strategy involves assigning data center resources based on the maximum resource demands (that is, the maximum arrival rate) of application A in the day. Static-Ave strategy involves allocating resources according to the average resource demands (that is, the average arrival rate) of application A in the day.

Figure 10:
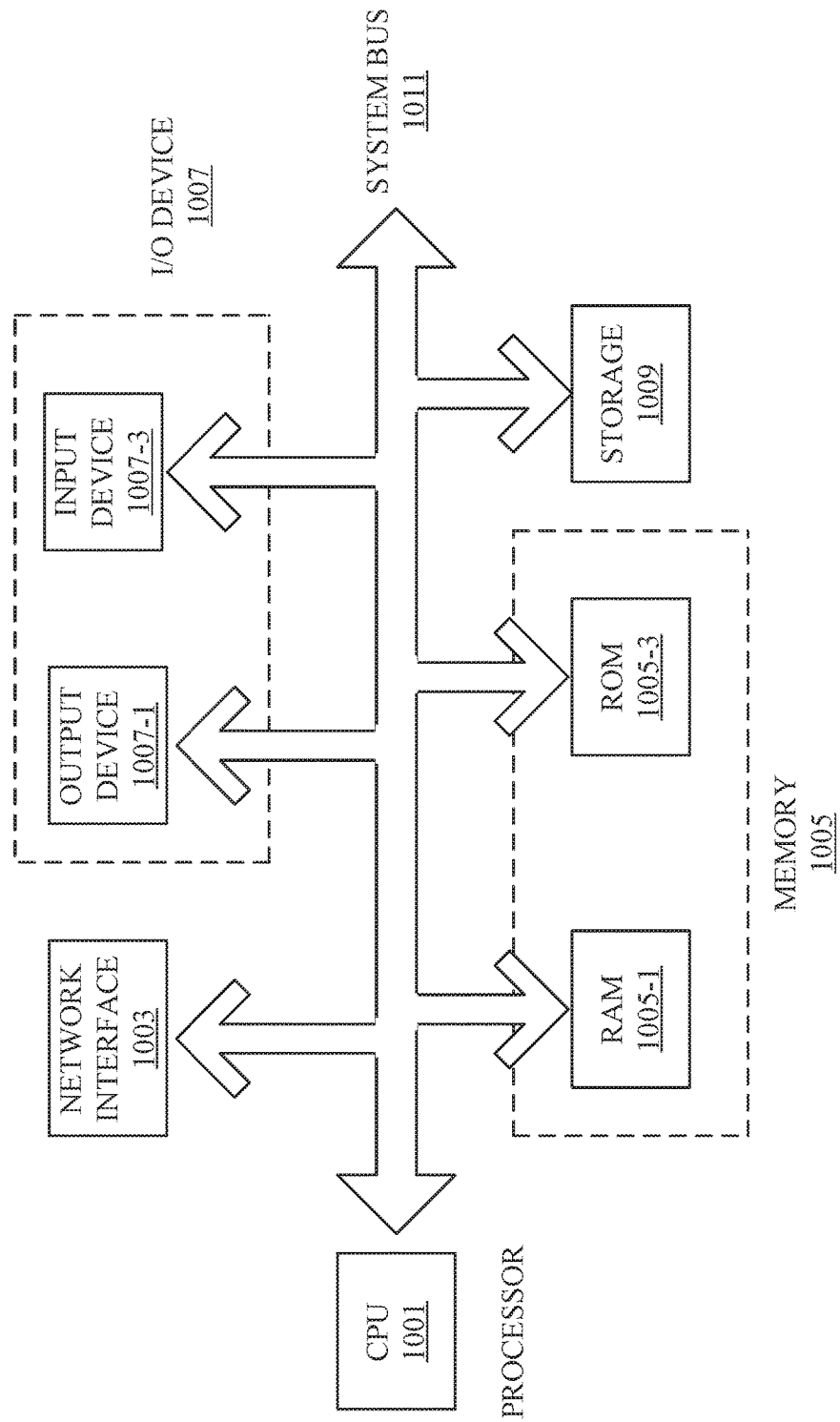
FIG. 10 illustrates a schematic diagram of a server according to an embodiment of the disclosure.

In FIG. 10, the resource manager 110 or resource management server may be implemented as a computer or a server which includes a central processing unit (CPU) 1001, a system memory 1005, and a system bus 1011. The system memory includes both read only memory (ROM) 1005-1 and random access memory (RAM) 1005-3. The ROM stores a basic input/output system (BIOS), which contains the basic routines that assist in the exchange of information between elements within the computer, for example, during start-up. The RAM stores a variety of information including an operating system, an application programs, other programs, and program data. The computer further includes a network interface 1003, input/output devices 1007 (including output devices 1007-1 and input devices 1007-3), and storage drives 1009, which read from and writes to storage media, respectively. The storage media may include but is not limited to flash memory, one or more hard disks, one or more magnetic disks, one or more optical disks (e.g. CDs, DVDs, and Blu-Ray discs), and various other forms of computer readable media. Similarly, the storage drives may include solid state drives (SSDs), hard disk drives (HDDs), magnetic disk drives, and optical disk drives. In some implementations, the storage media may store a portion of the operating system, the application programs, the other programs, and the program data.

The system bus couples various system components, including the network interface, the I/O devices and the system memory, to the CPU. The system bus may be of any of several types of bus structures including a memory bus or memory controller, a peripheral bus, and a local bus using any of a variety of bus architectures. The storage drives and their associated computer-readable media provide nonvolatile storage of computer readable instructions, data structures, programs, and other data for the computer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, performed by a resource management server, for resource allocation in a virtualization environment, the resource management server comprising a non-transient computer-readable medium and a processor to execute computer-executable instructions stored on the non-transient computer-readable medium, so that when the instructions are executed, the resource management server performs the method of:
    determining an average service rate for each virtual machine (VM) pool running an application;
    predicting a workload of the application;
    determining a set of collaborative VMs to serve the application in order to satisfy a service-level requirement, the set of collaborative VMs comprising a number of selected VMs from the VM pools running the application;
    distributing incoming application requests of the application among the VMs in the set of collaborative VMs, including:
        determining average service rates of each VM in the set of collaborative VMs;
        determining a workload to be assigned to each VM in the set of collaborative VMs using a Simplex method to maximize average resource utilization in the set of collaborative VMs; and
        assigning the incoming application requests to VMs in the set of collaborative VMs according to the workload to be assigned to each VM.

2. The method according to claim 1, wherein the determining the average service rate for each VM pool running the application comprises:
    identifying VM pools that are a same type as the application; and
    running the application on each identified VM pool to obtain the average service rate of VMs in each identified VM pool.

3. The method according to claim 2, wherein types of the application include: a center processing unit (CPU) intensive type, a memory intensive type, a network input/output (I/O) intensive type, and a graphic processing unit (GPU) intensive type.

4. The method according to claim 1, wherein the average service rate is a number of the incoming application requests of the application that one of the VMs serves in a time period.

5. The method according to claim 1, wherein the workload is predicted based on an autoregressive integrated moving average (ARIMA) model.

6. The method according to claim 5, wherein predicting the workload based on the ARIMA model comprises:
    determining whether data in a previous time series is stationary; and
    when the data in the previous time series is not stationary, predicting the workload based on the ARIMA model.

7. The method according to claim 1, wherein the workload is a number of incoming application requests of the application expected in a next time period.

8. The method according to claim 1, wherein the determining a set of collaborative VMs comprises:
    constructing a resource pool set for the application, the resource pool set including a same number of VMs from each of the VM pools;

determining a selection of VMs from the resource pool set using a Branch and Bound method; and determining whether the selection of VMs is optimal, wherein an optimal selection of VMs has a maximum average time for servicing application requests without violating the service-level requirement.

9. A device for resource allocation in a virtualization environment, the device comprising a non-transient computer-readable medium and a processor to execute computer-executable instructions stored on the non-transient computer-readable medium, so that when the instructions are executed, the device performs the method of:

determining an average service rate for each virtual machine (VM) pool running an application;

predicting a workload of the application;

determining a set of collaborative VMs to serve the application in order to satisfy a service-level requirement, the set of collaborative VMs comprising a number of selected VMs from the VM pools running the application;

distributing incoming application requests of the application among the VMs in the set of collaborative VMs, including:

determining average service rates of each VM in the set of collaborative VMs;

determining a workload to be assigned to each VM in the set of collaborative VMs using a Simplex method to maximize average resource utilization in the set of collaborative VMs; and assigning the incoming application requests to VMs in the set of collaborative VMs according to the workload to be assigned to each VM.

10. The device according to claim 9, further performing the method comprising:

identifying VM pools that are a same type as the application; and running the application on each identified VM pool to obtain the average service rate of VMs in each identified VM pool.

11. The device according to claim 10, wherein types of the application include: a center processing unit (CPU) intensive type, a memory intensive type, a network input/output (I/O) intensive type, and a graphic processing unit (GPU) intensive group.

12. The device according to claim 9, wherein the average service rate is a number of the incoming application requests of the application that one of the VMs serves in a time period.

13. The device according to claim 9, wherein the workload is predicted based on an autoregressive integrated moving average (ARIMA) model.

14. The device according to claim 13, further performing the method comprising:

determining whether data in a previous time series is stationary; and when the data in the previous time series is not stationary, predicting the workload based on the ARIMA model.

15. The device according to claim 9, wherein the workload is a number of incoming application requests of the application expected in a next time period.

16. The device according to claim 9, further performing the method comprising:

constructing a resource pool set for the application, the resource pool set including a same number of VMs from each of the VM pools;

determining a selection of VMs from the resource pool set using a Branch and Bound method; and determining whether the selection of VMs is optimal, wherein an optimal selection of VMs has a maximum average time for servicing application requests without violating the service-level requirement.

17. A non-transitory computer-readable medium for resource allocation in a virtualization environment, the non-transitory computer-readable medium comprising instructions which when executed by a hardware processor causes the hardware processor to implement operations including:

determining an average service rate for each virtual machine (VM) pool running an application;

predicting a workload of the application;

determining a set of collaborative VMs to serve the application in order to satisfy a service-level requirement, the set of collaborative VMs comprising a number of selected VMs from the VM pools running the application;

distributing incoming application requests of the application among the VMs in the set of collaborative VMs, including:

determining average service rates of each VM in the set of collaborative VMs;

determining a workload to be assigned to each VM in the set of collaborative VMs using a Simplex method to maximize average resource utilization in the set of collaborative VMs; and assigning the incoming application requests to VMs in the set of collaborative VMs according to the workload to be assigned to each VM.

18. The non-transitory computer-readable medium according to claim 17, wherein the determining the average service rate for each VM pool running the application further comprises:

identifying VM pools that are a same type as the application; and running the application on each identified VM pool to obtain the average service rate of VMs in each identified VM pool.

19. The non-transitory computer-readable medium according to claim 17, wherein the predicting the workload of the application comprises:

determining whether data in a previous time series is stationary; and when the data in the previous time series is not stationary, predicting the workload based on an autoregressive integrated moving average (ARIMA) model.

20. The non-transitory computer-readable medium according to claim 17, wherein the determining a set of collaborative VMs comprises:

constructing a resource pool set for the application, the resource pool set including a same number of VMs from each of the VM pools;

determining a selection of VMs from the resource pool set using a Branch and Bound method; and determining whether the selection of VMs is optimal, wherein an optimal selection of VMs has a maximum average time for servicing application requests without violating the service-level requirement.

\* \* \* \* \*